United States Patent
Fukudome

(10) Patent No.: US 8,965,806 B2
(45) Date of Patent: Feb. 24, 2015

(54) IMAGE IMAGING APPARATUS, IMAGE MANAGING METHOD, AND COMPUTER READABLE RECORDING MEDIUM

(75) Inventor: Kenji Fukudome, Kawabe-gun (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1318 days.

(21) Appl. No.: 12/144,239

(22) Filed: Jun. 23, 2008

(65) Prior Publication Data

US 2009/0208138 A1    Aug. 20, 2009

(30) Foreign Application Priority Data

Feb. 18, 2008 (JP) .................................. 2008-36529

(51) Int. Cl.
- G06F 21/00 (2013.01)
- G06F 21/31 (2013.01)
- G06F 21/60 (2013.01)

(52) U.S. Cl.
CPC .............. G06F 21/31 (2013.01); G06F 21/608 (2013.01); G06F 2221/0737 (2013.01); G06F 2221/2117 (2013.01); G06F 2221/2149 (2013.01)
USPC .......................................................... 705/50

(58) Field of Classification Search
USPC ........................................................... 705/50
See application file for complete search history.

(56) References Cited

U.S. PATENT DOCUMENTS

| | | | |
|---|---|---|---|
| 2005/0128506 A1* | 6/2005 | Sato | 358/1.14 |
| 2005/0219604 A1* | 10/2005 | Murakata | 358/1.14 |
| 2006/0015739 A1* | 1/2006 | Suzuki | 713/182 |
| 2007/0046976 A1 | 3/2007 | Kasatani | |
| 2007/0136598 A1 | 6/2007 | Endo | |
| 2007/0201085 A1* | 8/2007 | Yokochi | 358/1.15 |
| 2008/0046806 A1* | 2/2008 | Reddy et al. | 715/221 |
| 2008/0072052 A1* | 3/2008 | Suzuki | 713/176 |
| 2008/0225337 A1* | 9/2008 | Yano | 358/1.16 |

FOREIGN PATENT DOCUMENTS

| | | |
|---|---|---|
| JP | 08-098008 | 4/1996 |
| JP | 2006-087025 A | 3/2006 |
| JP | 2006-229429 | 8/2006 |
| JP | 2007-067840 | 3/2007 |
| JP | 2007-166049 A | 6/2007 |

OTHER PUBLICATIONS

Ota Naoki, machine language translation of Japan Publication No. 2006-087025, "Electronic Multi-Functioned Machine Adaptive to Network", Mar. 30, 2006, all pages.*

(Continued)

*Primary Examiner* — Calvin Cheung
(74) *Attorney, Agent, or Firm* — Buchanan Ingersoll & Rooney PC

(57) ABSTRACT

An image managing apparatus includes a storage unit that stores image data, a receive unit that receives an image transmission request, and a controller. Herein, the controller adds security information to the image data and transmits the image data from the storage unit to an external apparatus in response to the image transmission request. Moreover, the controller determines whether to add the security information to the image data on the basis of a value of a security addition flag for the box in which the image data is stored or a value of a security addition flag for the image data.

26 Claims, 14 Drawing Sheets

(56) References Cited

OTHER PUBLICATIONS

Merriam Webster's Collegiate Dictionary, 10th Ed., 1993, all pages.*
"A History of Windows", Microsoft.com, all pages, date unknown.*
"Windows 95/98: Getting Started", all pages, date unknown. Retreived from http://www.me.ua.edu/ges100/files/dws07.pdf.*
Notification of Reasons for Refusal issued in the corresponding Japanese Patent Application No. 2008-036529 dated Jan. 26, 2010, and an English Translation thereof.

* cited by examiner

Fig.4

| | BOX ID | BOX NAME | BOX TYPE | ACCESS-PERMITTED USER/GROUP | SECURITY ADDITION FLAG FB(FX) |
|---|---|---|---|---|---|
| BR1→ | 0001 | SUZUKI(BR1) | PRIVATE | USER UA | OFF |
| BR2→ | 0002 | ..... | ..... | ..... | ON |
| | ... | ... | ... | ... | ... |
| BG1→ | 0101 | FIRST DIVISION IN SALES DEPARTMENT | GROUP | GROUP G1 | OFF |
| | .. | .. | .. | ... | ... |

Fig.5

| FILE ID | FILE NAME | BOX NAME | SECURITY ADDITION FLAG FB(FY) |
|---------|-----------|----------|-------------------------------|
| 0001 | PRODUCT PHOTOGRAPH | BOX BR1 | ON |
| ... | ... | ... | ... |
| ... | ... | ... | ... |

<SELECTION OF TYPE OF PASSWORD>

- ⦿ USER (INDIVIDUAL PASSWORD)
- ○ GROUP (SHARED PASSWORD)

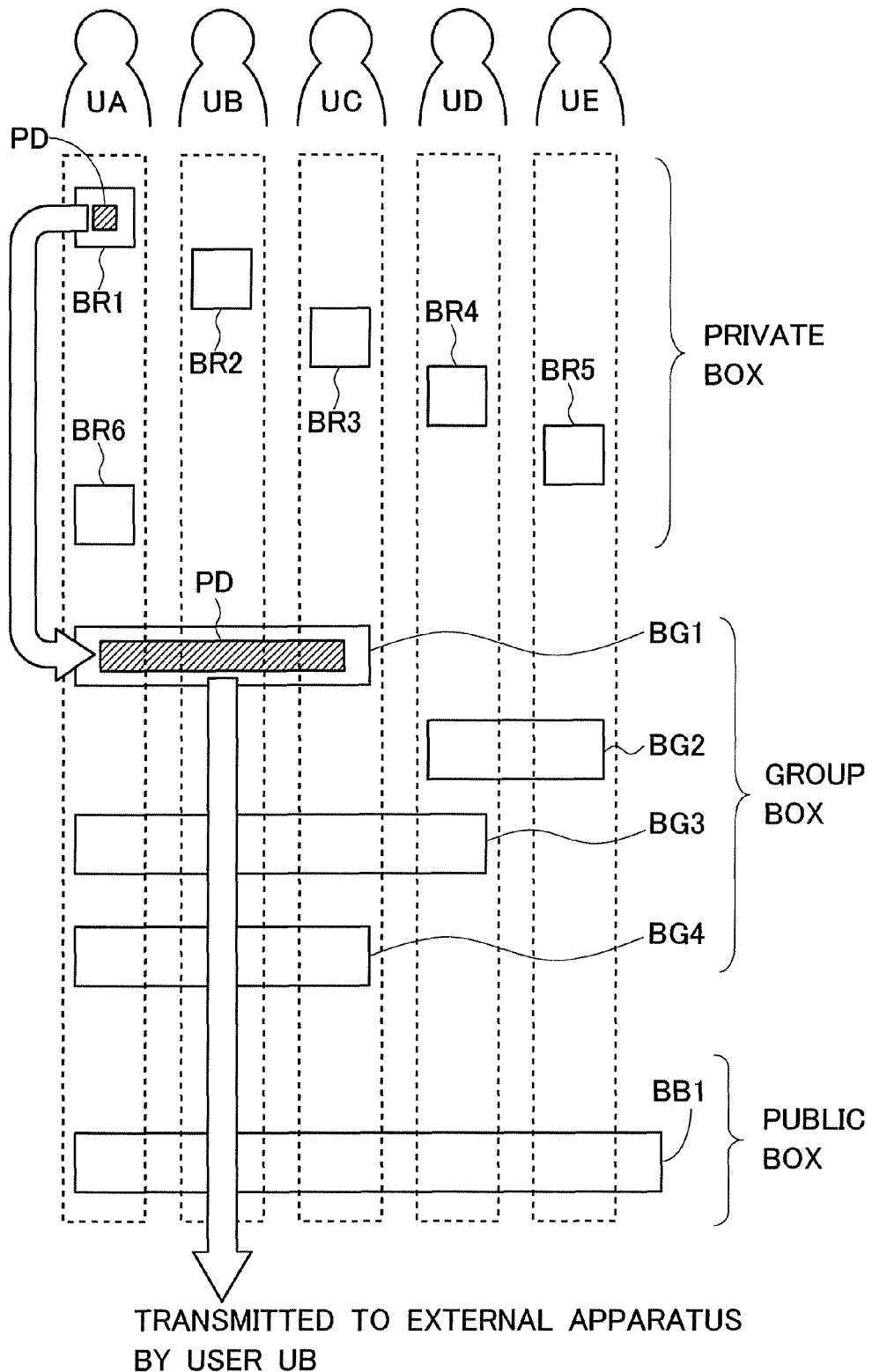

IMAGE IMAGING APPARATUS, IMAGE MANAGING METHOD, AND COMPUTER READABLE RECORDING MEDIUM

This application is based on Japanese Patent Application No. 2008-36529 filed on Feb. 18, 2008, the contents of which are hereby incorporated by reference.

BACKGROUND OF THE INVENTION

1. Field of the Invention

The present invention relates to an image managing apparatus that manages image data.

2. Description of the Background Art

An apparatus such as an MFP adopts a technique of storing image data generated therein. For example, the image data is stored in a box (also referred to as a folder) provided in the MFP. Then, the image data stored in the MFP is transmitted to an external apparatus (e.g., another computer) on a network, for example. Thus, a user of the external apparatus can acquire the image data through the external apparatus.

Herein, security of such image data must be ensured in some cases even after transmission of the image data to the external apparatus.

For example, Japanese Patent Application Laid-Open No. 2007-166049 discloses a technique of ensuring security. According to the technique disclosed in Japanese Patent Application Laid-Open No. 2007-166049, data obtained by scanning is transmitted while being encrypted with the use of an electronic certificate.

Moreover, Japanese Patent Application Laid-Open No. 2006-087025 discloses a technique concerning a scanning operation. According to this technique, first, a user inputs a user code upon execution of the scanning operation; thus, data obtained by scanning is stored in an external computer, with a password corresponding to the user code being added thereto. Then, the user inputs the password corresponding to the user code to view the scan data on the external computer.

Japanese Patent Application Laid-Open No. 2006-087025 also discloses a technique of automatically generating a password required for viewing data obtained by scanning, adding the password to the scan data, and sending the same password via e-mail.

However, the technique disclosed in Japanese Patent Application Laid-Open No. 2007-166049 requires use of an electronic certificate as an indispensable condition. That is, this technique is complicated in execution.

On the other hand, the technique disclosed in Japanese Patent Application Laid-Open No. 2006-087025 concerns a scanning operation. That is, this technique is different from a technique of transmitting image data stored in an image managing apparatus to an external apparatus. According to the technique disclosed in Japanese Patent Application Laid-Open No. 2006-087025, further, since a password is sent via e-mail, there is a risk of a leak of the password.

SUMMARY OF THE INVENTION

An object of the present invention is to provide an image managing apparatus capable of readily ensuring security required upon transmission of image data stored therein to an external apparatus, and a technique concerning the image managing apparatus.

According to a first aspect of the present invention, there is provided an image managing apparatus including a storage unit that stores image data in a box provided therein, a receive unit that receives an image transmission request, and a controller that adds security information to the image data and transmits the image data from the storage unit to an external apparatus in response to the image transmission request. Herein, the controller determines whether to add the security information to the image data on the basis of a value of a security addition flag for the box in which the image data is stored.

With this configuration, when a user who logs in to the image managing apparatus attempts to transmit image data to the external apparatus, the image managing apparatus automatically adds security information about the user to the image data. Therefore, it is possible to readily ensure security.

According to a second aspect of the present invention, there is provided an image managing apparatus including a storage unit that stores image data, a receive unit that receives an image transmission request, and a controller that adds security information to the image data and transmits the image data from the storage unit to an external apparatus in response to the image transmission request. Herein, the controller determines whether to add the security information to the image data on the basis of a value of a security addition flag for the image data.

With this configuration, when a user who logs in to the image managing apparatus attempts to transmit image data to the external apparatus, the image managing apparatus automatically adds security information about the user to the image data. Therefore, it is possible to readily ensure security.

The present invention is also directed to an image managing method and a recording medium each realizing a concept similar to that of the image managing apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows one example of information about a box;

FIG. 5 shows one example of information about image data;

FIG. 6 shows a setting screen for selecting a type of a password;

FIG. 14 conceptually shows a state where the image data copying operation and the image data transmitting operation are executed by different users.

DESCRIPTION OF THE PREFERRED EMBODIMENTS

Hereinafter, description will be given of preferred embodiments of the present invention with reference to the drawings.

1. Configuration

Figure 1:
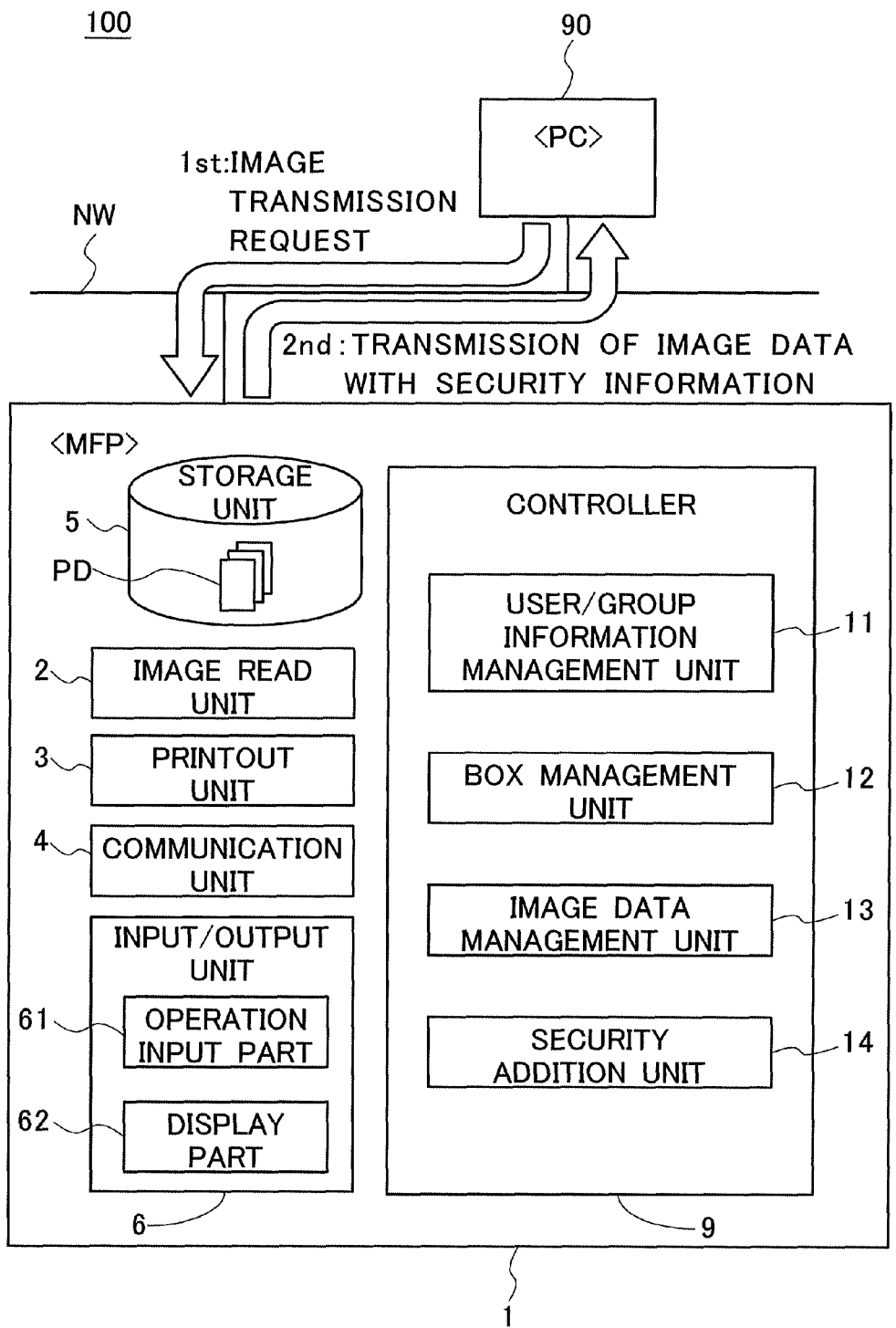
FIG. 1 schematically shows a configuration of an image transmitting and receiving system including an MFP.

FIG. 1 schematically shows a configuration of an image transmitting and receiving system 100 that includes an MFP (Multi Function Peripheral) 1.

The MFP 1 is connected to an external apparatus such as a computer 90 on a network NW to exchange data with the external apparatus. The MFP 1 receives a request to transmit image data (an image) stored therein, from the external apparatus or through an operation input part thereof. Herein, such a request is also referred to as an image transmission request. Then, the MFP 1 transmits the image data (the image) to the external apparatus in accordance with the image transmission request. Herein, examples of the network NW include a LAN (Local Area Network), the Internet, and other various networks.

The MFP 1 serves as an image managing apparatus. Moreover, the MFP 1 also serves as an image forming apparatus.

The MFP 1 is an apparatus that has functions as a scanner, a printer, a copier, a facsimile and the like. Such an apparatus is also referred to as a complex machine. Specifically, the MFP 1 includes an image read unit 2, a printout unit 3, a communication unit 4, a storage unit 5, an input/output unit 6 and a controller 9. These units are actuated in combination to realize the respective functions described above.

The image read unit 2 is a processing unit that optically reads a manuscript placed at a predetermined position in the MFP 1 to generate image data of the manuscript. Herein, such image data is also referred to as a manuscript image.

The printout unit 3 is an output unit that outputs an image onto various media such as a sheet of paper on the basis of image data of a target manuscript.

The communication unit 4 is a processing unit that allows communications via fax over a public line or the like. Further, the communication unit 4 allows network communications on the network NW. In order to establish the network communications, the communication unit 4 utilizes various protocols such as TCP/IP (Transmission Control Protocol/Internet Protocol) and FTP (File Transfer Protocol). The MFP 1 can exchange various kinds of data with other desired party through the network communications. In addition, the MFP 1 can send and receive e-mail messages through the network communications.

The storage unit 5 takes a form of a storage device such as a HDD (Hard Disk Drive). The storage unit 5 stores a manuscript image (image data) generated by the image read unit 2 and the like. The storage unit 5 has plural boxes (folders) provided therein, and the plural boxes store different kinds of image data, respectively, in actual. The storage unit 5 also stores user authentication information and the like.

The input/output unit 6 includes an operation input part 61 that receives an input to the MFP 1, and a display part 62 that displays various kinds of information. Specifically, the MFP 1 is provided with an operation panel 63 (see FIG. 11). The operation panel 63 has a configuration that a piezoelectric sensor and the like are embedded in a liquid crystal display panel. The operation panel 63 partially serves as the display part 62 and, also, partially serves as the operation input part 61.

The controller 9 is a control device that collectively controls the MFP 1. The controller 9 includes a CPU (Central Processing Unit) and various semiconductor memories such as a RAM (Random Access Memory) and a ROM (Read Only Memory). The processing units described above are actuated under control of the controller 9 to realize the respective functions of the MFP 1. Under control of the controller 9, for example, the image read unit 2 optically reads (scans) a target manuscript to generate a manuscript image, that is, the scanner function is realized. In addition, the controller 9 controls the following processes.

The CPU in the controller 9 carries out a predetermined software program (hereinafter, simply referred to as a program) stored in the ROM such as an EEPROM (Electrically Erasable and Programmable Read Only Memory) to realize the following processing units. Herein, the controller 9 serves as a print control system (a print control device).

Specific examples of the processing unit realized by the controller 9 include a user/group information management unit 11, a box management unit 12, an image data management unit 13 and a security addition unit 14.

The user/group information management unit 11 manages information about a user and information about a group.

The box management unit 12 manages information about a box. For example, the box management unit 12 manages setting of a type of the box (e.g., a private box, a group box, a public box), a security addition flag FB (FX) for the box, and the like.

The image data management unit 13 manages information about image data. The image data management unit 13 manages setting of a security addition flag FB (FY) for the image data, and the like.

The security addition unit 14, which is also referred to as a security control unit, manages an operation for transmitting image data to the external apparatus, an operation for moving image data in the MFP 1, an operation for copying image data in the MFP 1, and the like. In particular, the security addition unit 14 exchanges information with each of the user/group information management unit 11, the box management unit 12 and the image data management unit 13. In the operation for transmitting image data PD to the external apparatus, then, the security addition unit 14 adds security information such as a password to the image data PD.

In a case where a user who logs in to the MFP (the image managing apparatus) 1 issues an image transmission request to the MFP 1 such that image data stored in the storage unit 5 is transmitted to the external apparatus, the controller 9 having the processing units described above automatically adds, to the image data, security information containing a password for the user. This configuration brings about the following advantage. That is, each time the user attempts to transmit image data to the external apparatus, the user does not need to add a password to each image data. Therefore, the image data having the password added thereto can readily be transmitted to the computer 90 by the MFP 1. In particular, if image data to be transmitted has no password, a password is automatically added by the MFP 1 to the image data in a considerably simple manner. Such a transmitting operation will be described later in detail.

2. Users and Groups

Figure 2:
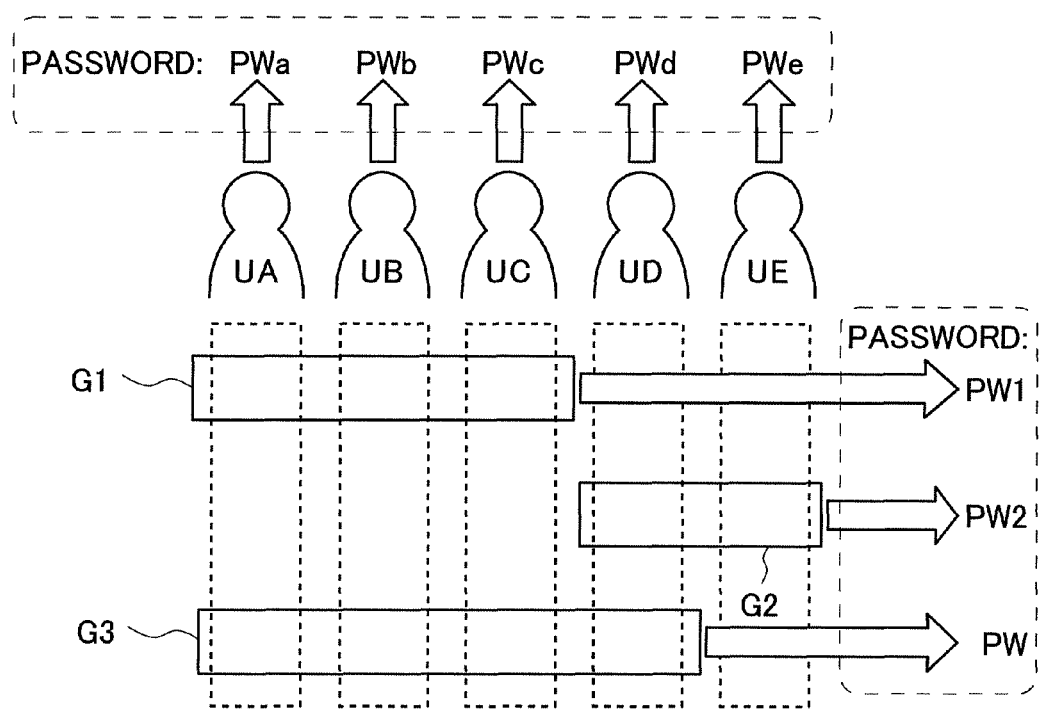
FIG. 2 shows a group to which a user belongs.

FIG. 2 shows a relation between a user and a group to which the user belongs. Specifically, FIG. 2 shows a fact that which users belong to which groups.

For example, the user UA belongs to the group G1 and the group G3. The same things hold true for the user UB and the user UC. The user UD belongs to the group G2 and the group G3. The user UE belongs to the group G2.

In other words, the group G1 has the users UA, UB and UC belonging thereto, the group G2 has the users UD and UE belonging thereto, and the group G3 has the users UA, UB, UC and UD belonging thereto.

The user/group information management unit 11 manages registration information about the relation between the user and the group to which the user belongs (i.e., member information of each group) in such a manner that the storage unit 5 stores the registration information. Likewise, the user/group information management unit 11 manages various passwords.

3. Box Configuration (Folder Configuration)

Figure 3:
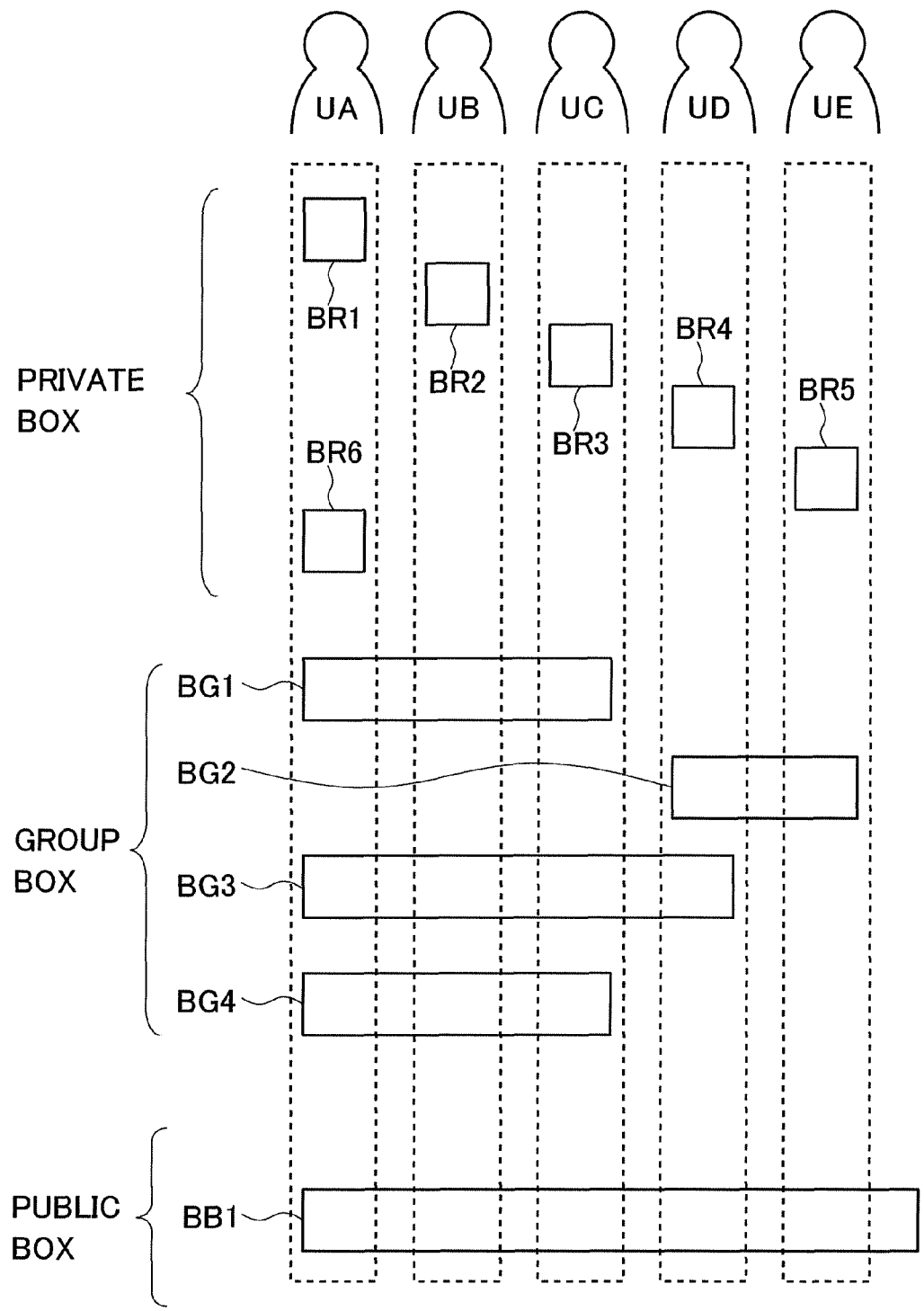
FIG. 3 conceptually shows a configuration of a box provided in a storage unit.

FIG. 3 conceptually shows a configuration of the box provided in the storage unit 5.

As described above, plural types of boxes (folders), more specifically, three types of boxes: a private box, a group box and a public box are provided in the storage unit 5. The private box is a box that permits access by a specific user. The group box is a box that permits access by a specific group. The public box is a box that permits access by all users.

As shown in FIG. 3, it is assumed herein that the private boxes BR1, BR2, BR3, BR4, BR5 and BR6, the group boxes BG1, BG2, BG3 and BG4, and the public box BB1 are provided in the storage unit 5.

In FIG. 3, moreover, an accessible range by each of the users UA to UE is indicated by a rectangular area shown by a broken line. That is, each of the users UA to UE can access the relevant rectangular box shown by the broken line.

For example, the user UA can access the private boxes BR1 and BR6 for the user UA.

Further, the user UA can access the group boxes BG1, BG3 and BG4. Each of the group boxes BG1 and BG4 permits access by a member of the group G1, and the group box BG3 permits access by a member of the group G3. The user UA who is a member of the groups G1 and G3 can access the group boxes BG1, BG3 and BG4 as described above.

In addition, the user UA can access the public box BB1.

Herein, the user UA can not access the boxes BR2, BR3, BR4, BR5 and BG2 other than the boxes described above, in principle.

Likewise, the user UB can access the private box BR2 for the user UB. Further, the user UB can access the group boxes BG1, BG3 and BG4. In addition, the user UB can access the public box BB1. Herein, the user UB can not access the boxes BR1, BR3, BR4, BR5, BR6 and BG2 other than the boxes described above, in principle.

The same things hold true for the user UC, except where the user UC can access the private box BR3 for the user UC, but can not access the private box BR2 for the user UB in principle.

The user UD can access the private box BR4 for the user UD, the group boxes BG2 and BG3, and the public box BB1. On the other hand, the user UD can not access the boxes BR1, BR2, BR3, BR5, BR6, BG1 and BG4 other than the boxes described above, in principle.

The user UE can access the private box BR5 for the user UE, the group box BG2, and the public box BB1. On the other hand, the user UE can not access the boxes BR1, BR2, BR3, BR4, BR6, BG1, BG3 and BG4 other than the boxes described above, in principle.

FIG. 4 shows one example of information about each box.

As shown in FIG. 4, each box has, assigned thereto, a box ID that indicates an identification number (a symbol) thereof, a box name that indicates a name thereof, a box type that indicates a type thereof, and an access-permitted user/group that indicates a user or a group having access thereto. Further, each box has, assigned thereto, a flag for determining whether security information is automatically added (ON) or not (OFF). Herein, such a flag is referred to as a security addition flag FB.

As shown in FIG. 4, examples of the information assigned to the private box BR1 include "0001" as the box ID, "SUZUKI" as the box name, "PRIVATE" as the box type, "USER UA" as the access-permitted user/group, and "OFF" as the security addition flag.

As shown in FIG. 4, further, examples of the information assigned to the group box BG1 include "0101" as the box ID, "FIRST DIVISION IN SALES DEPARTMENT" as the box name, "GROUP" as the box type, "GROUP G1" as the access-permitted user/group, and "OFF" as the security addition flag.

4. Image Data Configuration

FIG. 5 shows one example of information about each image data.

As shown in FIG. 5, each image data (each image file) has, assigned thereto, a file ID that indicates an identification number (a symbol) thereof, a file name that indicates a name thereof, and a box name that indicates a name of a box corresponding to an image data storage location. Further, each image data has, assigned thereto, a flag for determining whether security information is automatically added (ON) or not (OFF). Herein, such a flag is referred to as a security addition flag FB.

As shown in FIG. 5, examples of the information assigned to the image data PD1 include "0001" as the file ID, "PRODUCT PHOTOGRAPH" as the file name, "BOX BR1" as the box name, and "ON" as the security addition flag.

The image data PD in the MFP 1 has no security information. In other words, security information such as a password is not added to the image data PD in the MFP 1. On the other hand, the security addition flag FB is stored as information about security management (security management information) in the MFP 1 while being correlated with the image data PD in the MFP 1. In this embodiment, a determination whether to add security information such as a password to image data PD to be transmitted to the external apparatus is made on the basis of the security addition flag FB.

The security addition flag mentioned herein corresponds to the security addition flag FB for each box (see FIG. 4) or the security addition flag FB for each image data PD (see FIG. 5). As will be described later, if a security addition flag FB (FY) for specific image data PD is in an ON state, security information is added to the image data PD without fail, that is, a password is automatically added to the image data PD, at a timing that the image data PD is transmitted to the external apparatus. If a security addition flag FB (FX) for a specific box (see FIG. 4) is in an ON state, security information is added to image data PD stored in the box without fail at a timing that the image data PD is transmitted to the external apparatus, irrespective of details of a setting of a security addition flag FB (FY) for the image data PD (see FIG. 5). On the other hand, if the security addition flag FB (FX) for the box is in an OFF state and, also, the security addition flag FB (FY) for the image data PD is in an OFF state, the security information is not added to the image data PD in the box even when the image data PD is transmitted to the external apparatus.

5. Security Information (Password)

In this embodiment, as described above, when predetermined conditions are satisfied, security information is automatically added to image data.

Herein, a method of adding security information to image data is, for example, password lock to the image data (a data access restriction function using a password); however, the present invention is not limited thereto. For example, electronic sign information that requires input of a password may be added to image data.

The password mentioned herein is, for example, an individual password (a user-dedicated password) for a user; however, the present invention is not limited thereto. For example, the password may be a shared password for a group to which plural users belong. Use of the individual password for each user allows maintenance of security of image data that has been transmitted to the external apparatus, at a high level. On the other hand, use of the shared password for each group allows a person different from a user who has issued an image transmission request (herein, the person belongs to a group to which the user belongs) to readily view image data that has been transmitted to the external apparatus in a state where security of the image data is ensured. Moreover, the individual password for each user may be a login password for each user to the MFP 1. Use of this login password eliminates an operation for sending the password via e-mail separately. In addition, it is considered that a user hardly forgets his/her login password, leading to an advantage of preventing the user from forgetting his/her security information. The same things hold true for the shared password for each group. Specifically, the shared password for each group may be a password for permitting access to a group box. Use of this access permission password brings about an advantage similar to that described above.

Herein, a user selects one of the individual password for each user and the shared password for each group on a setting screen shown in FIG. 6.

FIG. 6 shows a setting screen for selecting a type of a password. Herein, a user previously selects a type of a password on the setting screen shown in FIG. 6. Moreover, it is assumed herein that the individual password for each user is a password which is previously registered in the MFP 1 for each user.

As shown in FIG. 2, specifically, if the user UA logs in to the MFP 1, the individual password to be used is a password PWa for the user UA registered in the MFP 1. Likewise, if the user UB logs in to the MFP 1, the individual password to be used is a password PWb for the user UB registered in the MFP 1. If the user UC logs in to the MFP 1, the individual password to be used is a password PWc for the user UC registered in the MFP 1. If the user UD logs in to the MFP 1, the individual password to be used is a password PWd for the user UD registered in the MFP 1. If the user UE logs in to the MFP 1, the individual password to be used is a password PWe for the user UE registered in the MFP 1. As described above, a password for a user who currently logs in to the MFP 1 is used as security information.

Further, it is assumed herein that an individual password automatically added as security information to image data PD is different from a login password for each user; however, the present invention is not limited thereto. For example, the individual password may be equal to the login password. Alternatively, the login password may be used as the individual password, that is, may be automatically added as security information to the image data PD.

Moreover, it is assumed herein that the shared password for each group is used as a password to be automatically added to the image data PD. In this case, preferably, a password for each group previously registered in the MFP 1 is used as the shared password. As shown in FIG. 2, specifically, if a member of the group G1 logs in to the MFP 1, the shared password to be used may be a password PW1 for the group G1 registered in the MFP 1. Likewise, if a member of the group G2 logs in to the MFP 1, the shared password to be used may be a password PW2 for the group G2 registered in the MFP 1. If a member of the group G3 logs in to the MFP 1, the shared password to be used may be a password PW3 for the group G3 registered in the MFP 1.

In a case where a user who belongs to a plurality of groups logs in to the MFP 1, preferably, a password to be used herein is selected from the passwords for the respective groups in accordance with a preset priority.

In this embodiment, moreover, even when image data is extracted from the private box, image data is extracted from the group box or image data is extracted from the public box, one of the two passwords described above is used for adding the security information to the target image data. That is, the security information is added to the image data while the shared password for each group and the individual password for each user are switched alternatively in the entire MFP 1.

6. Operations 6-1. Operation for Storing Image Data in Box

Next, description will be given of operations performed by the MFP 1.

Prior to description of an operation for transmitting image data to the external apparatus, description will be given of an operation for storing image data in a box, with reference to a flowchart of FIG. 7. Herein, FIG. 7 illustrates a case where a security addition flag FB (FY) for an image (image data PD) generated by a scanning operation is automatically set at an ON state on the basis of a batch protection setting of all pieces of scan data and a setting of a security addition flag FB (FX) for a box.

Figure 7:
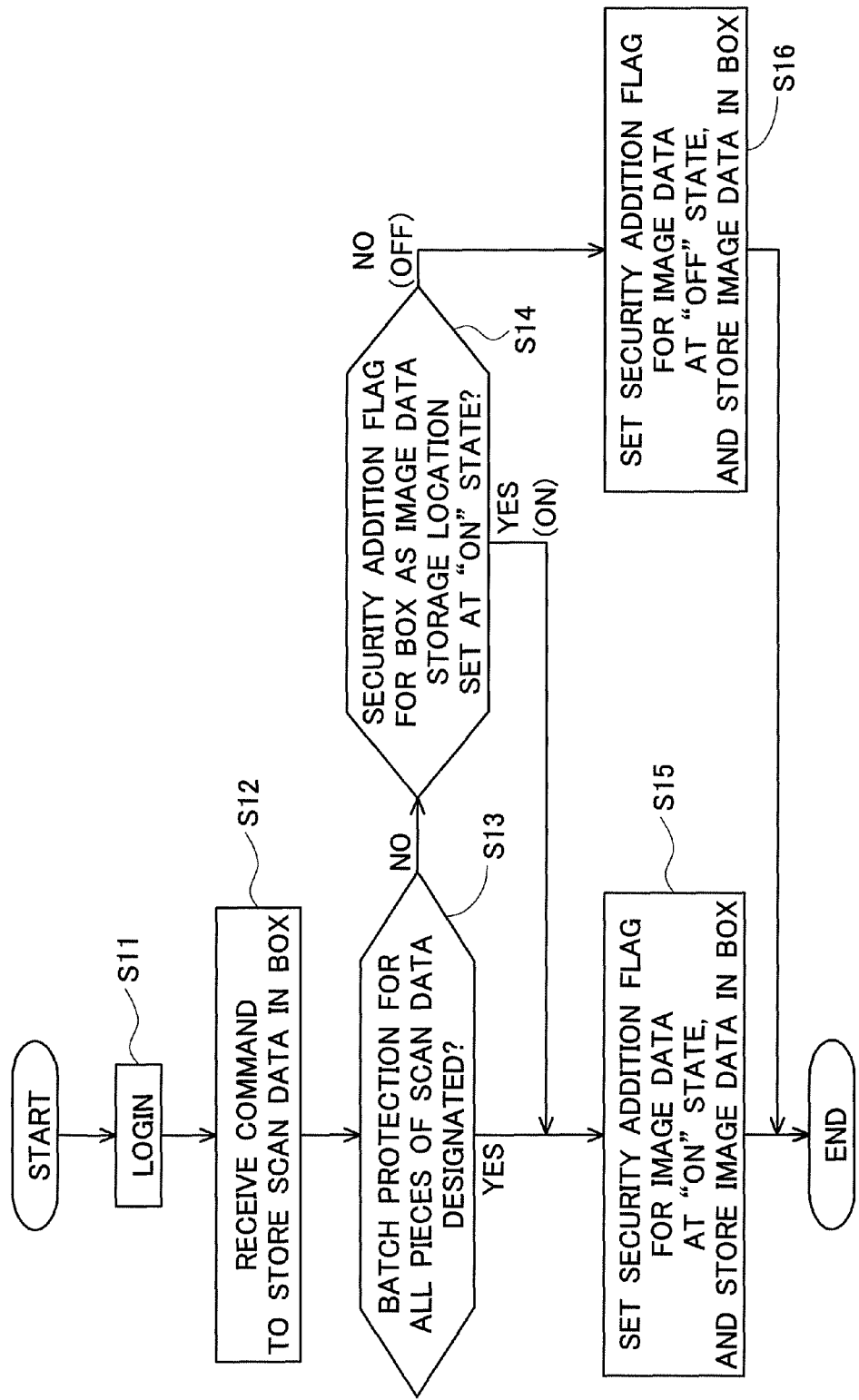
FIG. 7 shows a flow of processes of storing image data in a box.

With reference to FIG. 7, in step S11, first, a certain user (e.g., the user UA) logs in to the MFP 1.

In step S12, next, the user UA selects a menu item such as "Scan to HDD" through the operation input part 61 to allow the MFP 1 to perform an operation corresponding to the menu item. In MFP 1, specifically, the image read unit 2 optically reads a manuscript to generate image data (scan data) PD. In steps S13 to S16, next, the HDD in the storage unit 5 stores the image data PD generated as described above.

In steps S13 and S14, the MFP 1 determination whether to set, at an ON state, a security addition flag FB (FY) for the image data PD generated by the image read unit 2.

In step S13, specifically, the MFP 1 makes sure (examines) that a batch protection setting of all pieces of scan data is designated at an ON state (a user previously designates, in a batch manner, a fact that security information must be added without fail to each scan data to be transmitted to the external apparatus). Then, the processing proceeds to step S15. The user designates the batch protection setting for the scanning operation by the MFP 1 in a batch manner, on a setting screen (not shown).

In step S15, the security addition flag FB for the image data PD is set at the ON state, and the image data PD is stored in a target box (e.g., the box BR1). Accordingly, in a case where the batch protection setting is designated for all scanning operations by the MFP 1, the security addition flag FB for the image data PD is set at the ON state with respect to each scanning operation.

Even in a case where the user selects no setting of adding security information, if the MFP 1 makes sure that a security addition flag FB (FX) for the box in which the image data PD is stored is set at an ON state in step S14, the processing proceeds to step S15.

In step S15, as described above, the security addition flag FB for the image data PD is set at the ON state, and the image data PD is stored in the target box.

Accordingly, the user stores the image data PD in the box having the security addition flag FB set at the ON state, thereby automatically setting the security addition flag FB for the image data PD at the ON state. As will be described later, the MFP 1 can readily ensure security upon transmission of the image data PD to the external apparatus.

On the other hand, in a case where the batch protection setting is not designated and the security addition flag FB (FX) for the box in which the image data PD is stored is not set at the ON state, the processing proceeds to step S16. In step S16, the image data PD is stored in the target box in a state where the security addition flag FB (FY) for the image data PD is maintained at an OFF state.

Thus, the image obtained by the scanning operation is stored in the storage unit 5 of the MFP 1.

As described above, the value of the security addition flag FB for the image data PD is determined by the automatic setting operation; however, the present invention is not limited thereto. For example, the image data PD is stored in the target box in a state where the security addition flag FB for the image data PD is set at the ON state or the OFF state appropriately by various operations.

For example, the security addition flag FB for the image data PD, that has been set at the ON state originally, may be set at the OFF state later in accordance with the operation by the user through a setting change screen (not shown).

Conversely, the security addition flag FB for the image data PD, that has been set at the OFF state originally, may be set at the ON state later in accordance with the operation by the user through the setting change screen described above.

Herein, as one example, the security addition flag FB for the scan image (the image data PD) is automatically set at the ON state in accordance with the designation of the batch protection setting (steps S13 and S15); however, the present invention is not limited thereto. For example, the security addition flag FB for the image data PD may not be automatically set at the ON state in accordance with the designation of the batch protection setting. More specifically, the security addition flag FB for the image data PD may be set at the ON state in accordance with only execution of the setting operation by the user.

Also herein, as one example, the security addition flag FB for the scan image (the image data PD) is automatically set at the ON state in accordance with the setting of the security addition flag FB for the box (steps S14 and S15); however, the present invention is not limited thereto. For example, the security addition flag FB for the image data PD may not be set at the ON state in accordance with the security addition flag FB for the box. More specifically, the security addition flag FB for the box may be set at the ON state in accordance with only execution of the setting operation by the user.

Through the various operations described above, the security addition flag FB for the image data PD is stored in the target box while being set at the ON state or the OFF state appropriately.

6-2. Operation for Transmitting Image Data to External Apparatus (External Access)

Figure 8:
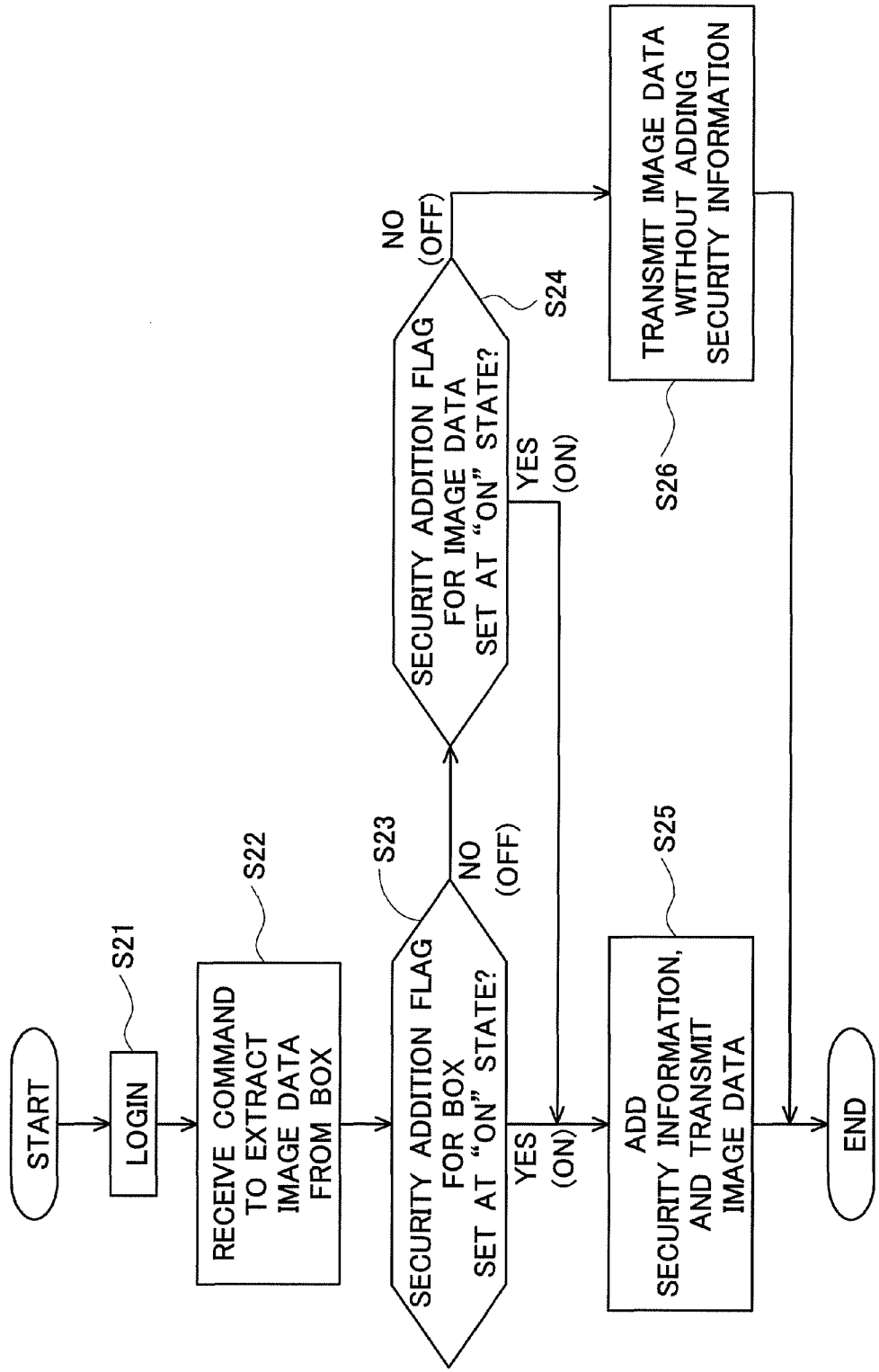
FIG. 8 shows a flow of processes of transmitting the image data stored in the box to an external apparatus.

With reference to a flowchart of FIG. 8, next, description will be given of an operation for transmitting image data stored in a box to the external apparatus (a transmitting operation). Herein, FIG. 8 illustrates a case where the user UA attempts to transmit image data PD stored in the box BR1 of the MFP 1 to the external computer, that is, the computer 90.

In step S21, first, the user UA logs in to the MFP 1 through the external computer 90 (see FIG. 1) on the network.

In step S22, next, the user UA who logs in to the MFP 1 executes, on the operation screen of the computer 90, an operation for moving or copying the image data PD stored in the box BR1 of the MFP 1 to a predetermined folder of the computer 90. For example, the user UA drags a mouse of the computer 90 to move an icon of the image data PD stored in the box BR1 to the predetermined folder of the computer 90, on the operation screen of the computer 90. In response to the operation executed by the user UA, then, the computer 90 issues a data transfer command to transmit the image data PD (i.e., an image transmission request) to the MFP 1.

In accordance with the operation executed by the user UA, the MFP 1 receives the data transfer command (the image transmission request) from the computer 90. In steps S23 to S26, next, the MFP 1 transfers the target image data PD stored in the storage unit 5 to the computer 90.

In steps S23 and S24, specifically, the MFP 1 determines whether to add security information to the target image data PD, on the basis of each of a value of the security addition flag FB (FX) for the box in which the image data PD is stored and a value of the security addition flag FB (FY) for the image data PD.

In step S23, more specifically, the MFP 1 may make sure that the security addition flag FB (FX) for the box BR1 (in which the image data PD is stored) is in an ON state. In this case, the MFP 1 determines that security information must be added to the image data PD. Then, the processing proceeds to step S25. In steps S23 and S24, on the other hand, the MFP 1 may make sure that the security addition flag FB (FX) for the box BR1 is in an OFF state (in step S23), but the security addition flag FB (FY) for the image data PD is in an ON state (in step S24). In this case, the MFP 1 determines that security information must be added to the image data PD. Then, the processing proceeds to step S25. As described above, if at least one of the security addition flag FB (FX) for the box BR1 and the security addition flag FB (FY) for the image data PD is in the ON state, the MFP 1 determines that the security information must be added to the image data. Then, the processing proceeds to step S25.

In step S25, the security information is added to the image data PD. Then, the image data PD is transferred from the MFP 1 to the computer 90, with the security information being added thereto. Herein, examples of the security information to be added to the image data PD may include those described above. For example, the image data PD is transferred to a folder designated as an image data storage location in the computer 90, with the password for the user UA being added thereto.

Figure 9:
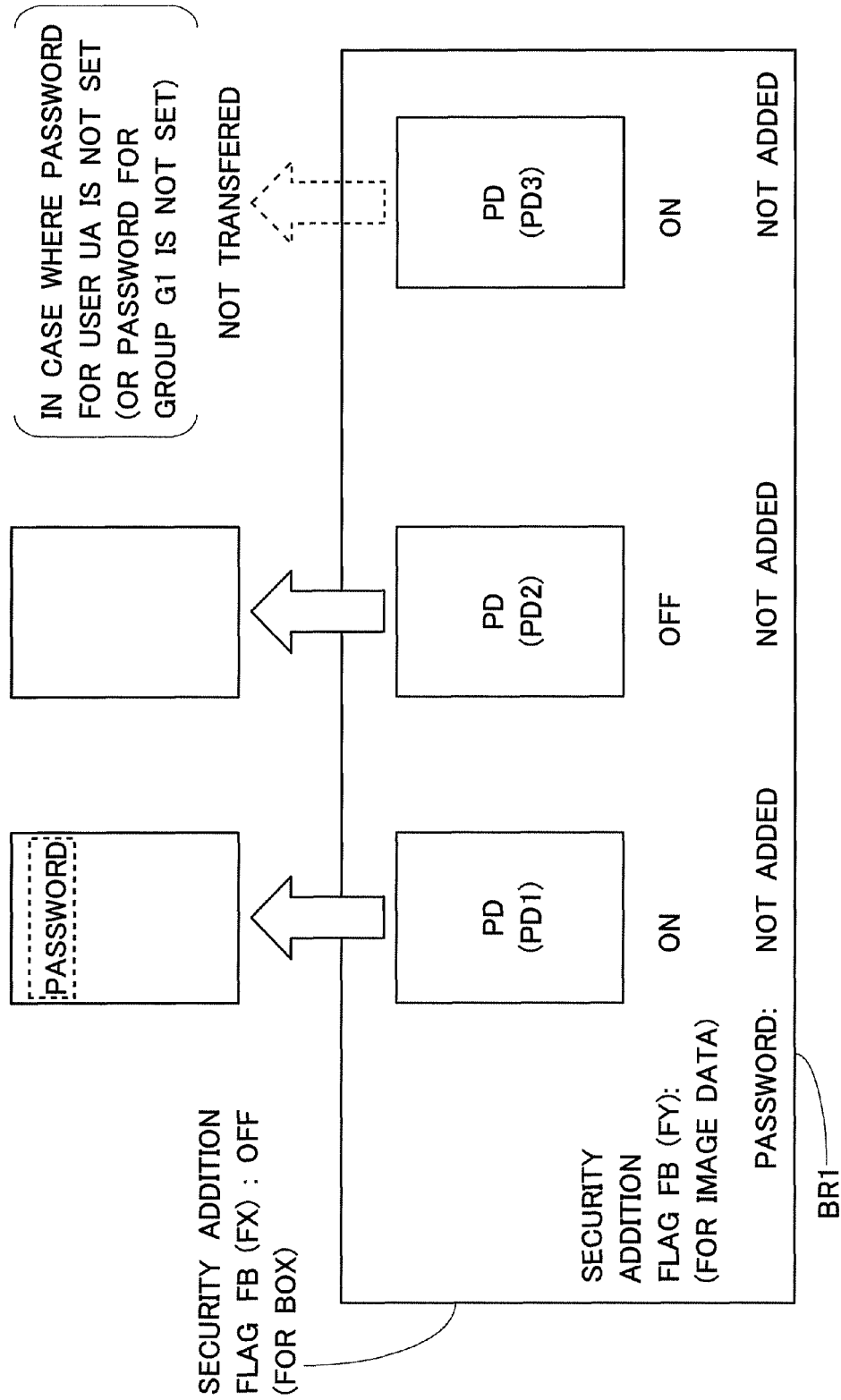
FIG. 9 conceptually shows the operation for transmitting the image data stored in the box to the external apparatus (in a case where a security addition flag for the box is in an OFF state)

As shown in FIG. 9, it is assumed that the security addition flag (FX) for the box BR1 is in the OFF state, but the security addition flag FB (FY) for the image data PD1 is in the ON state. In this case, the image data PD1 is transferred to the computer 90, with the password for the user UA being added thereto.

Figure 10:
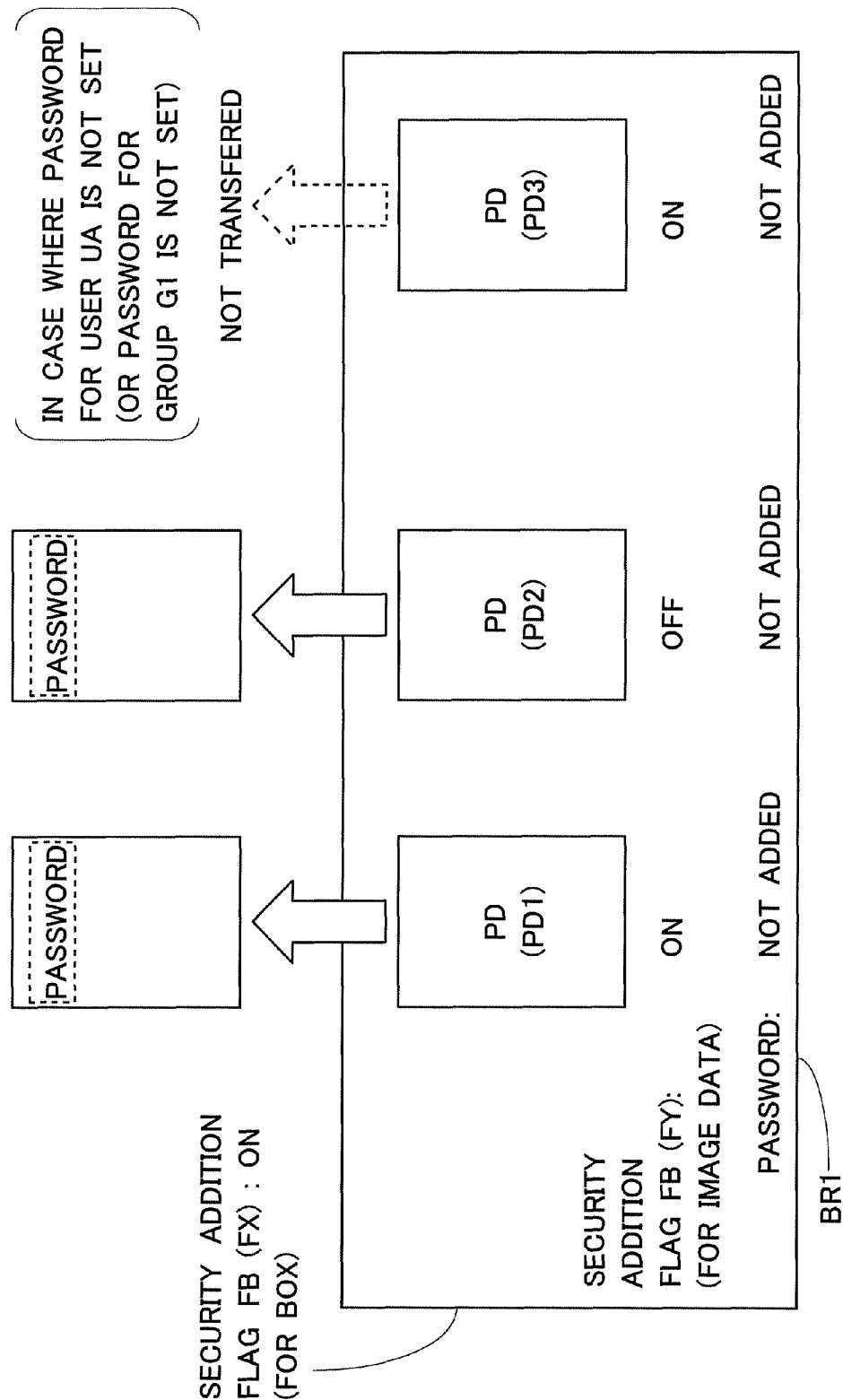
FIG. 10 conceptually shows the operation for transmitting the image data stored in the box to the external apparatus (in a case where the security addition flag for the box is in an ON state)

As shown in FIG. 10, further, it is assumed that the security addition flag FB (FX) for the box BR1 is in the ON state. In this case, each of the image data PD1 and the image data PD2 in the box BR1 is transferred to the computer 90, with the password for the user UA being added thereto. That is, each of the image data PD1 and the image data PD2 in the box BR1, with the password for the user UA being added thereto, is transferred to the computer 90 irrespective of a fact whether or not the security addition flag FB for each of the image data PD1 and the image data PD2 is in the ON state.

Thereafter, in order to allow the user to view the image data PD on the computer 90, the computer 90 requires authentication based on the security information. Specifically, the computer 90 requires input of a password. The user who attempts to view the image data inputs an authorized password, thereby viewing the image data PD.

As described above, when the image data PD is transferred from the MFP 1 to the external computer 90, the password for the user who logs in to the MFP 1 is automatically added to the image data PD. Accordingly, the MFP 1 can readily ensure security of the image data PD that has been transferred to the external computer 90. In addition, the MFP 1 requires no operation for sending a password via e-mail, unlike the conventional art. Therefore, the MFP 1 has no risk of a leak of a password in the case of sending the password via e-mail.

In particular, the MFP 1 determines whether to add the security information to the image data, on the basis of a value (an ON state or an OFF state) of the security addition flag FB (FX) for the box. Therefore, the MFP 1 does not need to make a determination whether to add security information for each of all pieces of image data. In other words, the MFP 1 can make a determination whether to add security information for plural pieces of image data stored in a box in a batch manner.

Further, the MFP 1 determines whether to add the security information to the image data PD, on the basis of a value of the security addition flag FB (FY) for the image data PD. Therefore, the MFP 1 can make a determination whether to add security information for each image data.

As described above, examples of the security information may include the individual password (the user-dedicated password) for each user, the shared password for each group to which the users belong, and the like. For example, when the individual password for the user UA is added to the image data PD, the security of the image data PD that has been transmitted to the external apparatus can be ensured at a high level. Alternatively, when the password for the group G1 to which the user UA belongs is added to the image data PD, another user (e.g., the user UB) who belongs to the group G1 to which the user UA belongs can readily view the image data PD that has been transmitted to the external apparatus in a state where the security of the image data is ensured.

In steps S23 and S24, on the other hand, it is assumed that each of the security addition flag FB for the box BR1 and the security addition flag FB for the image data PD is in the OFF state. In this case, the MFP 1 determines that no security information must be added to the image data PD. Then, the processing proceeds to step S26.

In step S26, the image data having no security information added thereto is transferred from the MFP 1 to the computer 90.

As shown in FIG. 9, for example, it is assumed that the security addition flag FB for the box BR1 is in the OFF state and the security addition flag FB for the image data PD2 is also in the OFF state. In this case, the image data PD2 having no password added thereto is transferred as it is to the computer 90.

In this case, the MFP 1 requires no authentication based on security information when a user attempts to view the image data PD (PD2) on the computer 90. That is, the user does not need to input a password. Accordingly, if there is no need to ensure security of the image data, the user can readily access the image data PD that has been transferred to the computer 90.

The operation described above is performed on the premise that the password for the user UA or the password for the group to which the user UA belongs is preset. On the other hand, in a case where the password for the user UA or the password for the group to which the user UA belongs is not set, it is preferable that the MFP 1 prohibits transfer of the image data at all times irrespective of the value of the security addition flag FB. In steps S22 and S23, for example, the MFP 1 determines whether to set the password for the user UA. If the password for the user UA or the password for the group to which the user UA belongs is not set, the MFP 1 terminates the processes shown in FIG. 7 without transferring the image data to the external apparatus. This configuration prevents reduction in security.

As shown in FIGS. 9 and 10, for example, even in a case where the security addition flag FB (FY) for the image data PD3 is in an ON state, if a password to be added to the image data PD3 (i.e., the password for the user UA or the password for the group G1) is not set, preferably, the MFP 1 prohibits transfer of the image data PD3.

The operation described above is also performed in all cases of the private box, the group box and the public box. In terms of security, preferably, a user who can extract image data PD from each box is restricted to a person who has a right to access the image data PD. In other words, preferably, the controller 9 makes sure that a user who logs in to the MFP 1 has a right to access the image data PD before transmission of the image data PD to the computer 90. The MFP 1 may determine whether to give the right to access the image data PD, on the basis of access right information set for the image data PD and/or on the basis of access right information set for the box in which the image data PD is stored.

6-3. Operation for Transmitting Image Data to External Apparatus (Operation Performed by MFP)

In the foregoing description, as one example, the image data PD is transferred from the MFP 1 to the external apparatus (the computer 90) on the basis of the transfer command issued by the external apparatus; however, the present invention is not limited thereto.

Figure 11:
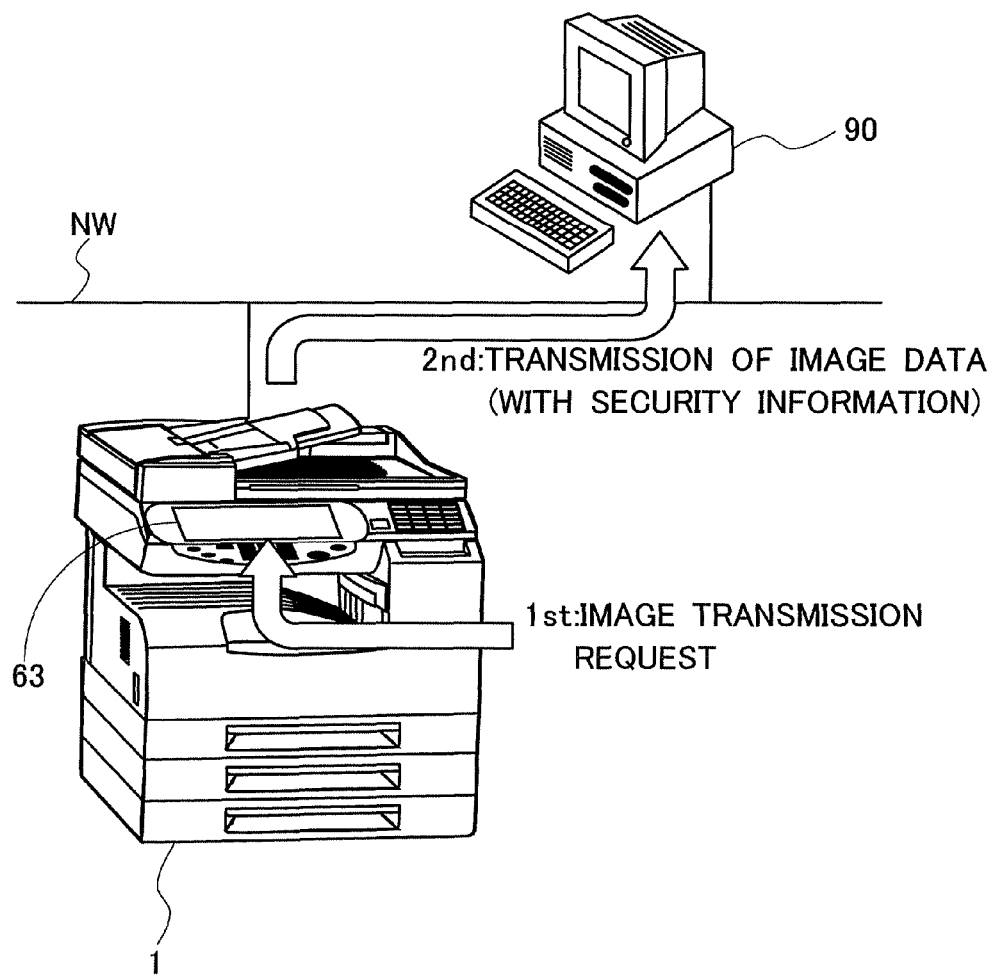
FIG. 11 conceptually shows an operation for transferring image data to the external apparatus in response to an image transmission request received by an operation input part of the MFP.

As shown in FIG. 11, for example, the image data may be transferred to the external apparatus in accordance with input through the operation input part 61 (e.g., the operation panel 63) of the MFP 1. Specifically, a user who logs in to the MFP 1 inputs an image transmission request through the operation screen displayed on the operation panel 63. In response to the image transmission request, then, the MFP 1 transfers the image data to the external apparatus through FTP or via e-mail.

6-4. Operation for Copying Image Data Inside MFP

With reference to a flowchart of FIG. 12, next, description will be given of an operation for copying image data in the MFP 1. Herein, detailed description will be given of the copying operation; however, the same things hold true for an operation for moving image data in the MFP 1 (a moving operation).

In step S31, first, a certain user (e.g., the user UA) manipulates the operation input part 61 of the MFP 1 to log in to the MFP 1.

In step S32, next, the user UA inputs a command to copy image data PD stored in a certain box (the private box BR1 herein) of the MFP 1 to another box (the group box BG1 herein) of the MFP 1, through the operation screen displayed on the operation input part 61.

In steps S33 to S36, the MFP 1 copies (transfers) the image data PD to be copied (to be transferred) from the box BR1 to the box BG1, in response to the command from the user UA.

In steps S33 and S34, specifically, the MFP 1 determines whether to set a security addition flag for the image data PD to be transferred at an ON state. That is, the security addition flag FB for the image data (the copied image data) PD after change of a storage location is determined on the basis of a value of the security addition flag FB for the image data (the image data to be copied) PD before change of the storage location and a value of the security addition flag FB for the box BR1.

In step S33, more specifically, the MFP 1 makes sure that the security addition flag FB (FX) for the box BR1 (in which the image data PD is stored) is in an ON state. Then, the processing proceeds to step S35. In step S34, on the other hand, the MFP 1 makes sure that the security addition flag FB (FX) for the box BR1 is in an OFF state, but the security addition flag FB (FY) for the image data PD is in an ON state. Then, the processing proceeds to step S35. As described above, when at least one of the security addition flag FB for the box BR1 and the security addition flag FB for the image data PD is in the ON state, the processing proceeds to step S35.

In step S35, the security addition flag FB for the image data PD is maintained at the ON state or is set at the ON state, so that the image data PD is copied to a new box.

At a timing that the image data PD is copied (or moved) in the MFP, however, no security information is added to the image data PD. The security information is added to the image data PD if necessary at a timing that the image data PD is transmitted from the MFP 1 to the external apparatus later. Specifically, processes similar to those shown in FIG. 8 are performed after completion of the processes shown in FIG. 12. That is, the MFP 1 determines whether to add security information to the image data PD and, then, transmits the image data PD to the external apparatus, on the basis of details of a setting of the security addition flag FB for the image data PD and details of a setting of the security addition flag FB for the box in which the image data PD is stored.

Figure 13:
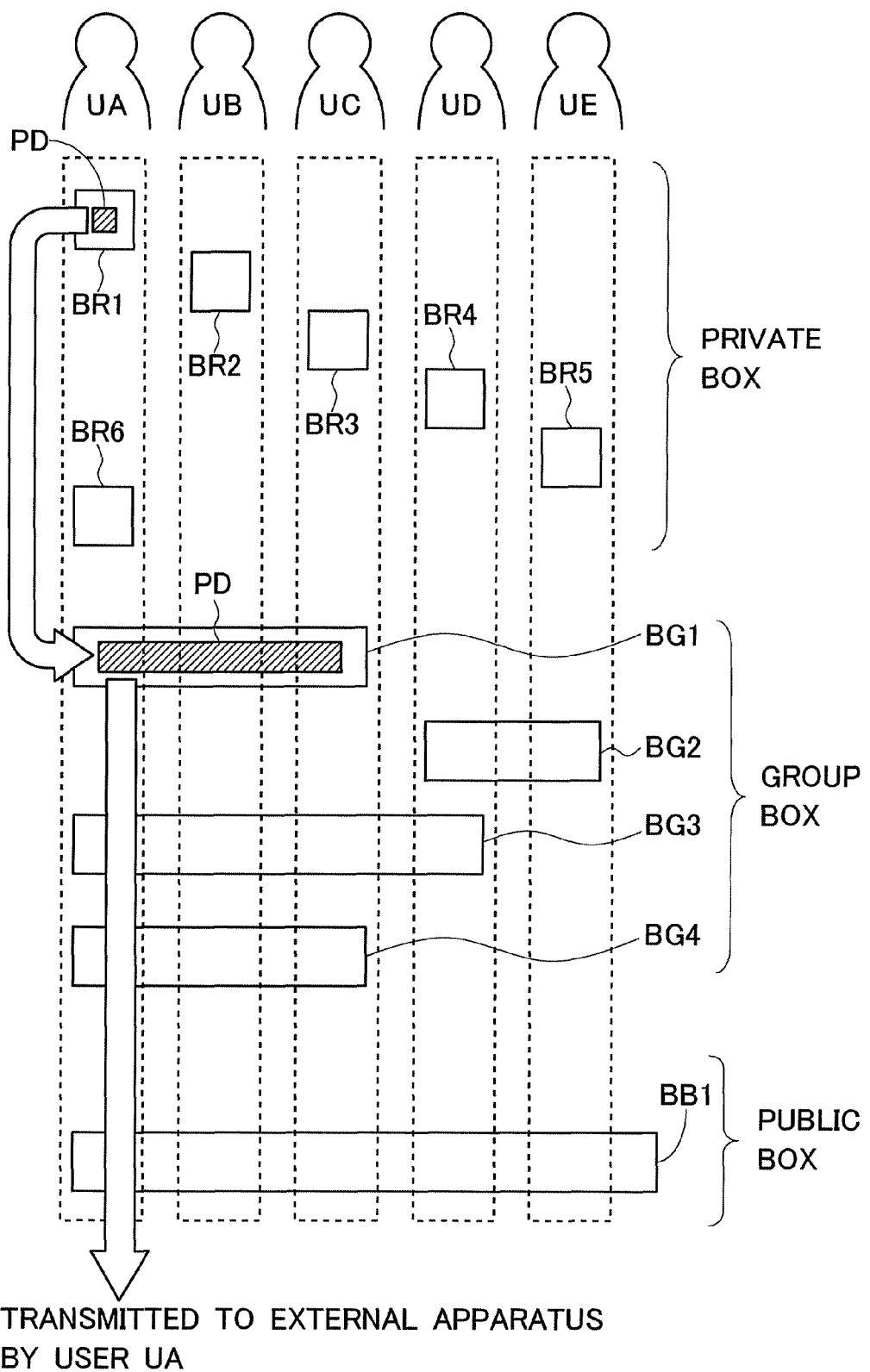
FIG. 13 conceptually shows a state where the image data copying operation and the image data transmitting operation are executed by a single user.

As shown in FIG. 13, for example, it is assumed that the image data PD is copied from the private box BR1 to the group box BG1 on the basis of the command from the user UA and, then, the user UA attempts to extract the image data from the MFP 1 through the computer 90. In this case, the image data PD is transferred to the computer 90 with a password for the user UA added thereto in accordance with the processes shown in FIG. 8; however, the present invention is not limited thereto. For example, the image data PD may be transmitted to the computer 90 with the password for the group G1 being added thereto.

When the image data PD is copied to the group box BG1, the member of the group G1 (in particular, the user UB or UC other than the user UA) can access the image data PD.

As shown in FIG. 14, therefore, it is also assumed that the image data PD is copied from the box BR1 to the box BG1 in accordance with the command from the user UA and, then, is transmitted to the computer 90 in accordance with a command from the user UB different from the user UA. In this case, the image data PD is transferred to the computer 90 with the password for the user UB being added thereto in accordance with the processes shown in FIG. 8; however, the present invention is not limited thereto. For example, the image data PD may be transmitted to the computer 90 with the password for the group G1 to which the user UB belongs (not the password for the user UB) being added thereto.

Thereafter, in order to allow the user to view the image data PD on the computer 90, the computer 90 requires authentication based on the security information. Specifically, the computer 90 requires input of a password. The user who attempts to view the image data inputs his/her authorized password, thereby viewing the image data PD. Accordingly, even when the image data PD stored in the MFP 1 is transferred to the external computer 90, the MFP 1 can readily ensure the security of the image data PD that has been transferred to the computer 90.

Figure 12:
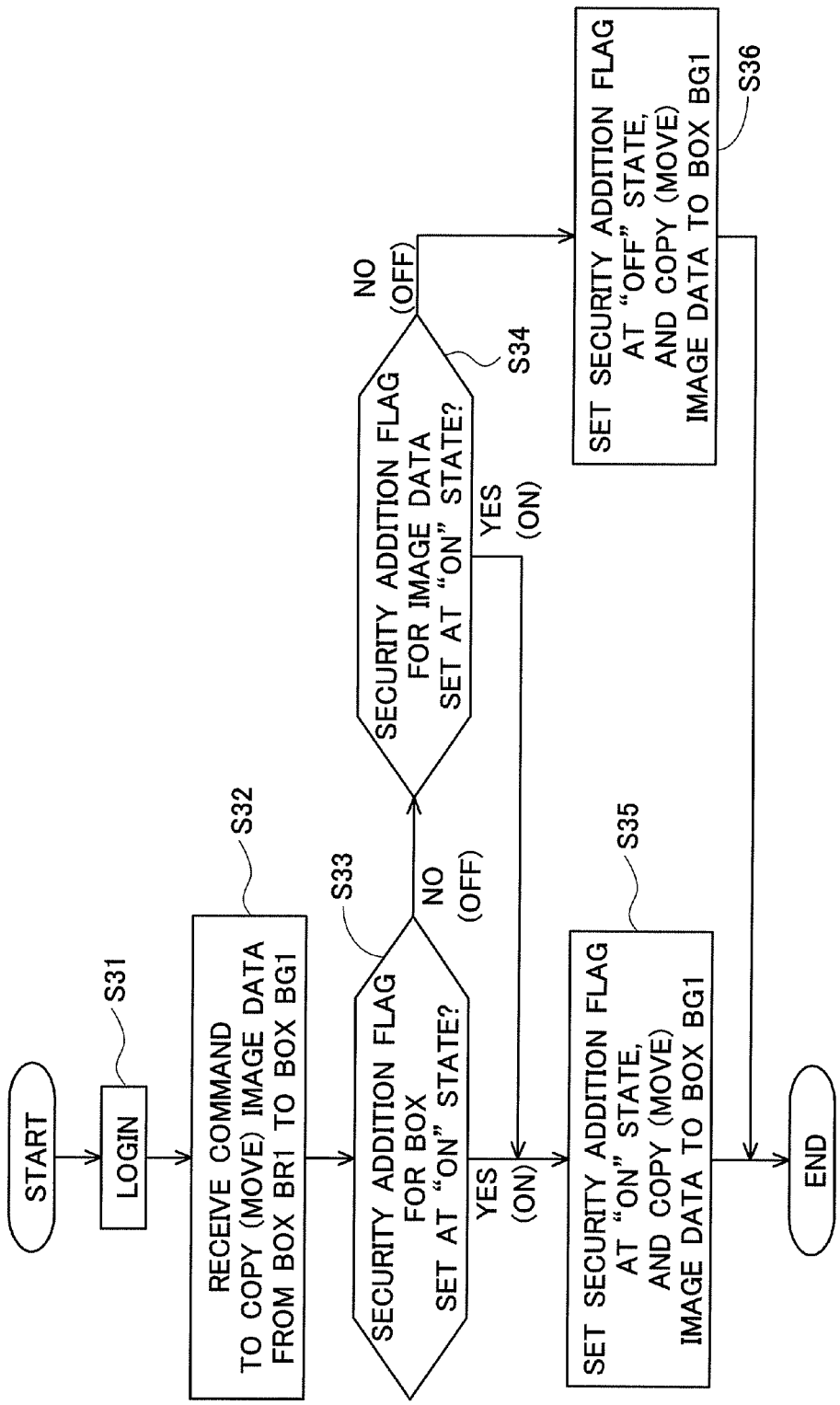
FIG. 12 shows a flow of processes of copying image data in the MFP.

Particularly, if the security addition flag FB for the private box BR1 is in an ON state, the security addition flag FB for the image data PD copied to the group box BG1 (i.e., the image data PD after change of the storage location) is set at the ON state in accordance with the processes shown in FIG. 12. That is, the value of the security addition flag for the box BR1 can be reflected on the value of the security addition flag FB for the image data PD after change of the storage location. Accordingly, the security of the image data PD can be prevented from being reduced even when the storage location of the image data PD is changed in the MFP 1 and, then, the image data PD is transmitted to the external apparatus.

If the security addition flag FB for the image data PD before change of the storage location is in an ON state, the security addition flag FB for the image data PD after change of the storage location is also set at the ON state. That is, the value of the security addition flag FB for the image data PD before change of the storage location can be reflected on the value of the security addition flag FB for the image data PD before change of the storage location. Accordingly, the security of the image data PD can be prevented from being reduced. In particular, if the image data is copied repeatedly, the security thereof can be prevented from being reduced.

On the other hand, if each of the security addition flag FB for the box BR1 and the security addition flag FB for the image data PD is in an OFF state, the processing proceeds to step S36.

In step S36, the security addition flag FB for the image data PD is maintained at the OFF state, and the image data PD is copied to a new box (e.g., the group box BG1).

If the image data PD is moved to the external apparatus after completion of the process in step S36, the MFP 1 determines whether to add security information to the image data PD, on the basis of the security addition flag FB for the box to which the image data PD is copied. That is, if the security addition flag FB for the group box BG1 is in the ON state, the process in step S25 is performed (see FIG. 8). On the other hand, if the security addition flag FB for the group box BG1 is in the OFF state, the process in step S26 is performed (see FIG. 8).

The copying operation and the moving operation described above are also performed in all cases of the private box, the group box and the public box. Preferably, the MFP 1 permits the copying operation under the condition that a user who issues a copying command has a right to access at least the box in which the image data to be copied is stored. Also preferably, the MFP 1 permits the copying operation under the condition that the user who issues the copying command has a right to access the box to which the image data is copied. Also preferably, the operation for transmitting the copied image data PD from the MFP 1 to the external apparatus are permitted to only a user who has a right to access a box to which the image data PD is copied.

As described above, at the time when the image data PD is copied or moved from the box BR1 to the box BG1 in the MFP 1, the image data PD is not subjected to password lock yet. Thereafter, when the image data PD is transmitted to the external apparatus, the image PD is subjected to password lock. This configuration can suppress the restriction to the copying operation in the MFP 1 at minimum.

When the image data PD stored in the box BG1 is transmitted to the external apparatus, the password for the user who has issued a command to transmit the image data PD is added to the image data PD. With this configuration, the security of the image data PD can be ensured readily at the time when the image data PD is transmitted to the external apparatus. As described above, moreover, at the time when the image data PD stored in the box BG1 is transmitted to the external apparatus, the password for the group to which the user who has issued a command to transmit the image data PD belongs may be added to the image data PD. With this configuration, plural users in one group can readily view the image data PD.

7. Others

The preferred embodiment of the present invention has been described above; however, the present invention is not limited thereto.

In the foregoing embodiment, as one example, at the time when the image data PD is copied in the MFP 1, the value of the security addition flag FB for the image data PD is automatically set at the ON state in accordance with the value of the security addition flag FB for the box (steps S33 and S35); however, the present invention is not limited thereto. In the copying operation performed by the MFP 1, specifically, the details of the setting of the security addition flag FB for the image data PD may be maintained without change.

In the foregoing embodiment, moreover, at the time when the image data PD is copied in the MFP 1, no security information is added to the image data PD; however, the present invention is not limited thereto. For example, also at the time when the image data PD is copied in the MFP 1, security information such as a password may be automatically added to the image data PD.

In the foregoing embodiment, as one example, the shared password for each group and the individual password for each user are alternatively switched in the entire MFP 1; however, the present invention is not limited thereto.

Specifically, a password to be set may be changed in accordance with a type of a box that stores image data to be extracted. More specifically, (1) an individual password for a user may be set for extracting image data from a private box, and (2) a shared password for a group may be set for extracting image data from a group box.

In the foregoing embodiment, as one example, the password for the user or the password for the group is added to the image data PD; however, the present invention is not limited thereto. For example, the image data PD to which a password for a box is automatically added may be transmitted from the MFP 1 to the external apparatus. More specifically, at the time when the image data PD stored in the box BG1 is transmitted to the external computer 90, a password for each box (a password for the box BG1 herein) may be automatically added to the image data PD.

While the invention has been shown and described in detail, the foregoing description is in all aspects illustrative and not restrictive. It is therefore understood that numerous modifications and variations can be devised without departing from the scope of the invention.

What is claimed is:

1. An image managing apparatus comprising:
    a storage unit that includes a plurality of boxes for storing image data, wherein each of the plurality of boxes has a preset value of a security addition flag; and
    a processor configured to:
        receive an image transmission request to transmit a specific image data stored in one of the boxes in the storage unit from the image managing apparatus to an external apparatus;
        determine whether to add security information to the specific image data based on the preset value of the security addition flag set for the one box in response to the image transmission request;
        add the security information to the specific image data after the processor has determined, based on the value of the security addition flag for the one box in which the specific image data is stored, that the security information is to be added to the specific image data; and
        transmit the specific image data including the security information from the storage unit to the external apparatus.

2. The image managing apparatus according to claim 1, wherein the security information added to the image data contains at least one of a password for a user who logs in to the image managing apparatus to issue the image transmission request, a password for a group to which the user belongs, and a password for the box in which the image data is stored.

3. The image managing apparatus according to claim 1, wherein
    image data is moved or copied in the storage unit such that a storage location for the image data is changed from a first box to a second box and,
    then, is transmitted to the external apparatus, the controller determines whether to add the security information to the image data on the basis of a value of a security addition flag for the image data after change of the storage location.

4. The image managing apparatus according to claim 3, wherein the value of the security addition flag for the image data after change of the storage location is determined on the basis of a value of the security addition flag for the image data before change of the storage location and a value of a security addition flag for the second box.

5. The image managing apparatus according to claim 1, wherein the image data is moved or copied in the storage unit such that a storage location for the image data is changed from a first box to a second box and,
    then, is transmitted to the external apparatus, a controller determines whether to add the security information to the image data on the basis of a value of a security addition flag for the second box and a value of a security addition flag for the image data before change of the storage location.

6. The image managing apparatus according to claim 1, wherein a controller makes sure that the user who logs in to the image managing apparatus has a right to access the image data, before transmission of the image data.

7. The image managing apparatus according to claim 1, wherein
    the image data is moved or copied in the storage unit such that a storage location for the image data is changed from a first box to a second box, a controller adds no password to the image data, and
    wherein the image data is transmitted to the external apparatus after change of the storage location, the controller adds the security information containing a password to the image data.

8. The image managing apparatus according to claim 1, wherein the processor is configured to receive the image transmission request from outside of the image managing apparatus.

9. The image managing apparatus according to claim 8, wherein the processor is configured to receive the image transmission request from the external apparatus.

10. An image managing apparatus comprising:
    a storage unit that stores image data;
    a processor configured to:
        receive an image transmission request to transmit a specific image data stored in the storage unit from the image managing apparatus to an external apparatus;
        determine whether to add security information to the specific image data based on a preset value of the security addition flag set for the specific image data in response to the image transmission request;

add the security information to the specific image data after the processor has determined, based on the value of the security addition flag for the specific image data, that the security information is to be added to the specific image data; and transmit the specific image data including the security information from the storage unit to the external apparatus in response to the image transmission request.

11. An image managing method concerning image data stored in one of a plurality of boxes provided in a storage unit of an image managing apparatus, wherein each of the plurality of boxes has a preset value of a security addition flag, the method comprising:
  a) receiving, via the image managing apparatus, an image transmission request to transmit a specific image data stored in one of the boxes of the storage unit from the image managing apparatus to an external apparatus;
  b) determining, via the image managing apparatus, whether to add security information to the specific image data based on the preset value of the security addition flag set for the one box in response to the image transmission request;
  c) adding, via the image managing apparatus, security information to the specific image data after a processor has determined, based on the value of the security addition flag for the one box in which the specific image data is stored, that the security information is to be added to the specific image data; and
  d) transmitting, via the image managing apparatus, the specific image data including the security information from the storage unit to the external apparatus in response to the image transmission request.

12. The image managing method according to claim 11, wherein the security information added to the image data contains at least one of a password for a user who logs in to the image managing apparatus to issue the image transmission request, a password for a group to which the user belongs, and a password for the box in which the image data is stored.

13. The image managing method according to claim 11, wherein
  the image data is moved or copied in the storage unit such that a storage location for the image data is changed from a first box to a second box and,
  then, is transmitted to the external apparatus, after a controller has determined, in the step c), whether to add the security information to the image data, on the basis of a value of a security addition flag for the image data after change of the storage location.

14. The image managing method according to claim 13, wherein the value of the security addition flag for the image data after change of the storage location is determined on the basis of a value of the security addition flag for the image data before change of the storage location and a value of a security addition flag for the first box.

15. The image managing method according to claim 11, wherein
  the image data is moved or copied in the storage unit such that a storage location for the image data is changed from a first box to a second box and,
  then, is transmitted to the external apparatus, after a controller has determined, in the step c), whether to add the security information to the image data, on the basis of a value of a security addition flag for the second box and a value of a security addition flag for the image data after change of the storage location.

16. The image managing method according to claim 11, wherein
  a controller makes sure, in the step c), that the user who logs in to the image managing apparatus has a right to access the image data, before transmission of the image data.

17. The image managing method according to claim 11, wherein
  the image data is moved or copied in the storage unit such that a storage location for the image data is changed from a first box to a second box, no password is added to the image data in the step c), and
  where wherein the image data is transmitted to the external apparatus after change of the storage location, the security information containing a password is added to the image data in the step c).

18. An image managing method concerning image data stored in a storage unit of an image managing apparatus, the method comprising:
  a) receiving, via the image managing apparatus, an image transmission request to transmit a specific image data stored in the storage unit from the image managing apparatus to an external apparatus;
  b) determining, via the image managing apparatus, whether to add security information to the specific image data based on a preset value of a security addition flag set for the specific image data;
  c) adding, via the image managing apparatus, the security information to the specific image data after a processor has determined, based on the value of the security addition flag for the specific image data, that the security information is to be added to the specific image data; and
  d) transmitting, via the image managing apparatus, the specific image data including the security information from the storage unit of the image managing apparatus to the external apparatus.

19. A non-transitory computer readable recording medium storing a computer program for performing the steps of:
  a) receiving, via an image managing apparatus, an image transmission request concerning specific image data stored in one of a plurality of boxes provided in a storage unit of the image managing apparatus, wherein each of the plurality of boxes has a preset value of a security addition flag;
  b) determining, via the image managing apparatus, whether to add security information to the specific image data based on the preset value of the security addition flag set for the one box in response to the image transmission request;
  c) adding, via the image managing apparatus, security information to the specific image data after a processor has determined, based on the value of the security addition flag for the one box in which the specific image data is stored, that the security information is to be added to the specific image data; and
  d) transmitting, via the image managing apparatus, the specific image data including the security information from the storage unit of the image managing apparatus to the external apparatus.

20. The non-transitory recording medium according to claim 19, wherein the security information added to the image data contains at least one of a password for a user who logs in to the image managing apparatus to issue the image transmission request, a password for a group to which the user belongs, and a password for the box in which the image data is stored.

21. The non-transitory recording medium according to claim 19, wherein
  the image data is moved or copied in the storage unit such that a storage location for the image data is changed from a first box to a second box and,
  then, is transmitted to the external apparatus, after a controller has determined, in the step c), whether to add the security information to the image data, on the basis of a value of a security addition flag for the image data after change of the storage location.

22. The non-transitory recording medium according to claim 21, wherein the value of the security addition flag for the image data after change of the storage location is determined on the basis of a value of the security addition flag for the image data before change of the storage location and a value of a security addition flag for the first box.

23. The non-transitory recording medium according to claim 19, wherein the image data is moved or copied in the storage unit such that a storage location for the image data is changed from a first box to a second box and, then, is transmitted to the external apparatus, after a controller has determined, in the step c), whether to add the security information to the image data, on the basis of a value of a security addition flag for the second box and a value of a security addition flag for the image data after change of the storage location.

24. The non-transitory recording medium according to claim 19, wherein a controller makes sure, in the step c), that the user who logs in to the image managing apparatus has a right to access the image data, before transmission of the image data.

25. The non-transitory recording medium according to claim 19, wherein the image data is moved or copied in the storage unit such that a storage location for the image data is changed from a first box to a second box, no password is added to the image data in the step c), and the image data is transmitted to the external apparatus after change of the storage location, the security information containing a password is added to the image data in the step c).

26. A non-transitory recording medium storing a computer executable program comprising the steps of:

a) receiving, via an image managing apparatus, an image transmission request concerning specific image data stored in a storage unit of the image managing apparatus;

b) determining, via the image managing apparatus, whether to add security information to the specific image data based on a preset value of a security addition flag set for the specific image data;

c) adding, via the image managing apparatus, the security information to the specific image data after a processor has determined, based on the value of the security addition flag for the specific image data, that the security information is to be added to the specific image data; and d) transmitting, via the image managing apparatus, the specific image data including the security information from the storage unit of the image managing apparatus to the external apparatus.

* * * * *